(12) United States Patent
Stevens

(10) Patent No.: US 8,438,209 B1
(45) Date of Patent: May 7, 2013

(54) OPTICAL ADDER WITH OPTICAL CARRY

(75) Inventor: Rick C. Stevens, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 1002 days.

(21) Appl. No.: 12/481,223

(22) Filed: Jun. 9, 2009

(51) Int. Cl.
*G06F 7/50* (2006.01)
*G06F 7/38* (2006.01)

(52) U.S. Cl.
USPC ........... 708/670; 708/201; 708/203; 708/205; 708/490; 708/835

(58) Field of Classification Search .................. None
See application file for complete search history.

(56) References Cited

U.S. PATENT DOCUMENTS

| | | | |
|---|---|---|---|
| 2003/0090784 A1* | 5/2003 | Kim et al. | 359/344 |
| 2008/0266626 A1* | 10/2008 | Zalevsky et al. | 359/108 |

OTHER PUBLICATIONS

Optical addition architecture.
Optical multiply architecture.
Optical multiply and add architecture.

\* cited by examiner

*Primary Examiner* — Scott Sun
(74) *Attorney, Agent, or Firm* — Hamre, Schumann, Mueller & Larson, P.C.

(57) ABSTRACT

An analog optical adder system that achieves high precision results. The system uses an analog optical carry function to provide a result having a precision higher than the precision of the individual elements of the system. The optical carry function is created by optical carry determinators that are configured to add an optical carry, if any, to an optical signal associated with a next adjacent byte of the digital signals being added. The use of optical carry enables greater overall addition precision.

18 Claims, 1 Drawing Sheet

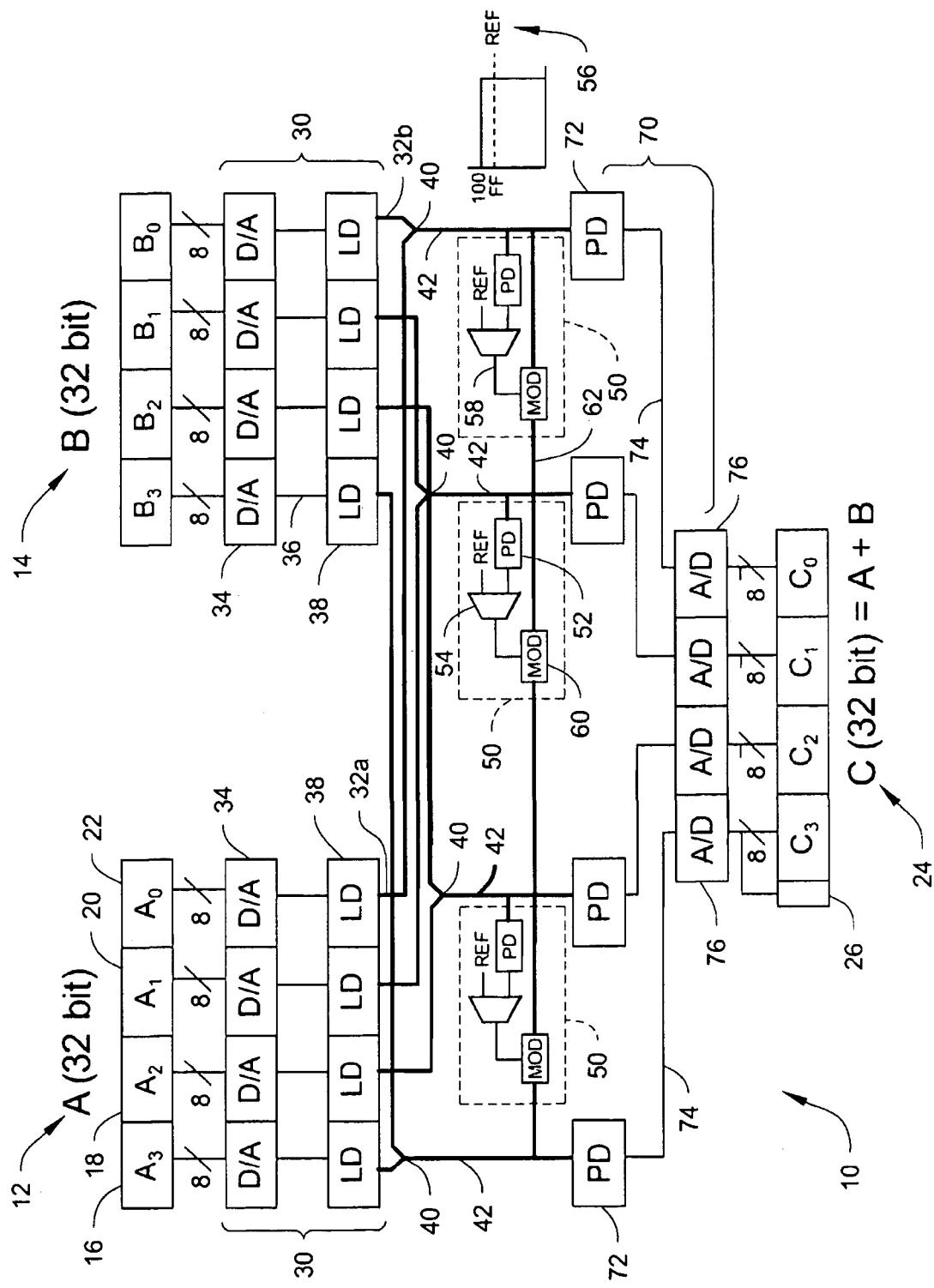

OPTICAL ADDER WITH OPTICAL CARRY

FIELD

This disclosure relates to an analog optical adder.

BACKGROUND

The use of analog optical processing elements to perform analog optical addition is known. The processing elements used typically have low precision. One way in which the low precision of the processing elements has been addressed is by writing specific algorithms in an attempt to make use of the lower precision functions. Another way in which the low precision has been addressed is by using external digital logic to correct or improve precision.

SUMMARY

An analog optical adder system and method are described that achieves high precision results. The system uses individual lower precision elements together with an analog optical carry function to provide a result having a precision higher than the precision of the individual elements.

The system uses optical carry determinators that provide the carry function to add an optical carry, if any, to an optical signal of a next adjacent byte of the digital signals being added. The use of optical carry enables greater overall addition precision.

In one disclosed embodiment, an optical adding system is described for adding first and second digital data signals. Each data signal has a plurality of bytes including a most significant byte and a least significant byte. For each byte, a digital to optical converter converts each byte of the first and second digital data signals into a respective optical signal. Optical summers are connected to the digital to optical converters of common byte positions, with the optical summers being configured to sum the optical signals associated with the common byte positions to create a plurality of summed optical signals equal in number to the number of bytes in each of the first and second digital data signals. Optical carry determinators are connected to the optical summers of the common byte positions, except for the optical summer of the most significant byte position. The optical carry determinators determine whether an optical carry should be added to the summed optical signal of a next adjacent byte position. An optical to digital converter for each summed optical signal converts the summed optical signals, plus any added carry, to digital data signals and assembles the summed digital data signals into byte order to create a summed digital data signal representing a sum of the first and second digital data signals.

A method of adding first and second digital data signals is also described, where each data signal has a plurality of bytes including a most significant byte and a least significant byte. Each byte of the first and second digital data signals is converted into a respective optical signal. The optical signals of common byte positions of the first and second digital data signals are summed to create a plurality of summed optical signals equal in number to the number of bytes in each of the first and second digital data signals. For the summed optical signal associated with the least significant bytes, it is determined whether the power of the summed optical signal is above a reference power threshold, and a carry is created if the power of the summed optical signal of the least significant bytes is above the reference power threshold and the carry is added to the summed optical signal associated with the next byte position of the first and second digital data signals. Thereafter, the summed optical signals, plus any carry, are converted to summed digital data signals and the summed digital data signals are assembled into byte order to create a summed data signal representing a sum of the first and second digital data signals.

DRAWINGS

The drawing depicts the exemplary analog optical adder system described in the detailed description.

DETAILED DESCRIPTION

An exemplary analog optical adder system 10 is illustrated in the drawing. The system 10 is designed to add first and second digital data signals 12, 14. In the illustrated example, the data signals 12, 14 are 32 bit data signals, with each data signal having a plurality of bytes of 8 bits each. The bytes are arranged in a LSB 0 numbering scheme including a most significant byte 16 at byte position 3, followed by byte 18 at byte position 2, followed by byte 20 at byte position 1, followed by a least significant byte 22 at byte position 0. Although four bytes are illustrated, the number of bytes and bits of each signal described herein is exemplary only, it being understood that digital signals containing other numbers of bytes and bits, including, but not limited to, 4 bits, 16 bits, 64 bits, or other number of bits, could be used. In addition, although the system 10 is described as adding two data signals, the concepts described herein can be applied to an adder that adds more than two data signals together.

The system 10 adds the data signals 12, 14 and produces a summed data signal 24 representing a sum of the first and second digital data signals. The summed data signal 24 is a 32 bit digital signal arranged in the original LSB 0 numbering scheme of the original signals 12, 14. The elements used in the system 10 can have 9-bit precision so the summed data signal 24 can have a carry over bit 26.

A digital to optical converter 30 is assigned to each byte 16, 18, 20, 22 that converts each byte into a respective optical signal 32. For example, for the least significant bytes 22 and byte positions 0, the converters 30 at those two byte positions convert the 8 bits of each byte into optical signals 32a, 32b. Any devices suitable for converting digital signals into optical signals can be used. In the illustrated example, the converters 30 include a digital-to-analog converter 34 for converting the digital signals to analog signals 36, with the analog signals 36 then being input into laser diodes 38 that convert the analog signals into the optical signals 32.

The optical signals 32 from each pair of common byte positions are input into an optical summer 40. Each summer 40 sum the two optical signals 32 to create a plurality of summed optical signals 42 equal in number to the number of bytes, in this example four, in the first and second digital data signals.

Optical carry determinators 50 are connected to the optical summers 40 of byte positions 0, 1 and 2. The optical carry determinators 50 are configured to be able to sense the summed optical signals 42 of byte positions 0, 1, 2, determine whether the power of the summed optical signal is above a reference power threshold, create an optical carry if the power of the summed optical signal is above the reference power threshold and add the carry to the summed optical signal associated with the next left byte position.

Any devices that are able to perform these functions of the determinators 50 can be used. In the illustrated system 10, each determinator 50 comprises a photo diode 52 that senses the summed signal 42 and outputs an electrical signal representative of the power level of the summed optical signal. The electrical signal is fed to a logic device 54 that also receives or has programmed therein a reference power threshold 56. The logic device 54 compares the signal from the photo diode 52 with the threshold 56 and if the signal from the photo diode 52 is greater than the threshold 56, then the logic device 54 sends a signal 58 to an optical modulator 60 which adds an optical carry 62 (i.e. an increment of optical power) to the summed optical signal 42 of the next left byte position. If the signal from the photo diode 52 is less than the threshold 56, then an optical carry is not added to the next left byte position. The logic device 54 can be any device that can perform these described functions of the logic device, such as a comparator or a thresholder.

In one example, the threshold 56 for each of the determinators 50 is the same. However, in some circumstances, the thresholds 56 of one or more of the determinators 50 could be different from the thresholds 56 of other determinators. In fact, due to changes in the optical power levels, the same function could have different threshold levels. Also, in some applications, multiple thresholds could be used, for example in more complex arithmetic operations. Any threshold(s) can be used that provide the ability to make a determination at one stage that can control an optical output of another stage(s).

In the illustrated example, the optical carry 62 is the difference between the power level of the summed optical signal 42 and the reference power threshold 56. That difference in the power levels is the amount of incremental optical power that is to be added to the summed optical signal 42 of the next left byte position. In another example, the optical carry is a fixed amount of incremental optical power regardless of how much the optical power exceeds the threshold.

For example, for the least significant bytes 22, the signals 32a, 32b are summed resulting in the summed signal 42. The photodiode 52 senses the summed signal 42 and outputs an electrical signal that is fed to the logic device 54. The logic device compares the power level of the summed signal 42 with the reference power threshold 56. If the power of the summed optical signal is above the threshold 56, the difference between the two is determined. The logic device 54 then sends the signal 58 to the optical modulator 60 instructing the modulator to optically send an increment of optical power (i.e. the optical carry 62) representing the difference to the summed optical signal 42 of byte position 1. That carry 62 is then added to the summed optical signal 42 of byte position 1. A similar process occurs in the optical carry determinators 50 for byte position 1 and byte position 2.

Each of the summed optical signals 42, plus any added carry in the case of byte positions 1, 2 and 3, is fed to an optical to digital converter 70 that converts the summed optical signals into the summed digital signal 24. Any devices suitable for doing this conversion can be used. In the illustrated example, the converters 70 include photodiodes 72 for converting the optical signals to analog signals 74, with the analog signals 74 then being input into analog-to-digital converters 76 that convert the analog signals into digital signals. The converters 76 are arranged so that the individual digital signals are assembled in byte order to create the summed signal 24 representing a sum of the first and second digital data signals.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of adding first and second digital data signals, each data signal having a plurality of bytes including a most significant byte and a least significant byte, comprising:
    converting each byte of the first and second digital data signals into a respective optical signal;
    summing the optical signals of common byte positions of the first and second digital data signals to create a plurality of summed optical signals equal in number to the number of bytes in each of the first and second digital data signals;
    for the summed optical signal associated with the least significant bytes, determining whether the power of the summed optical signal is above a reference power threshold, and creating a carry if the power of the summed optical signal of the least significant bytes is above the reference power threshold and adding the carry to the summed optical signal associated with the next byte position of the first and second digital data signals; and thereafter
    converting the summed optical signals, plus any added carry, to summed digital data signals and assembling the summed digital data signals into byte order to create a summed data signal representing a sum of the first and second digital data signals.

2. The method of claim 1, wherein creating the carry comprises determining the difference between the power of the summed optical signal of the least significant bytes and the reference power threshold.

3. The method of claim 1, wherein the first and second digital data signals include at least one byte between the most significant byte and the least significant byte; and further comprising, for each byte position between the most significant byte and the least significant byte, determining whether the power of the summed optical signal associated with each byte position is above a reference power threshold for that byte position, and creating a carry for each byte position if the power of the summed optical signal associated with a byte position is above the reference power threshold of that byte position and adding the carry to the summed optical signal associated with the next left byte position.

4. The method of claim 3, wherein creating each carry comprises determining the difference between the power of the summed optical signal and the reference power threshold of the respective byte position.

5. The method of claim 1, wherein there are two bytes between the most significant byte and the least significant byte.

6. The method of claim 3, wherein the reference power thresholds are the same or different.

7. The method of claim 1, wherein converting each byte of the first and second digital data signals into a respective optical signal comprises converting the first and second digital data signals into respective analog signals, and then converting the analog signals into optical signals.

8. The method of claim 1, wherein converting the summed optical signals to digital data signals comprises converting the summed optical signals into respective summed analog signals, and then converting the summed analog signals into summed digital signals.

9. The method of claim 1, wherein the carry is a fixed amount if the power of the summed optical signal of the least significant bytes exceeds the reference power threshold.

10. An optical adding system for adding first and second digital data signals, each data signal having a plurality of bytes including a most significant byte and a least significant byte, comprising:

for each byte, a digital to optical converter that converts each byte of the first and second digital data signals into a respective optical signal;

optical summers connected to the digital to optical converters of common byte positions, the optical summers are configured to sum the optical signals associated with the common byte positions to create a plurality of summed optical signals equal in number to the number of bytes in each of the first and second digital data signals;

optical carry determinators connected to the optical summers of the common byte positions, except for the optical summer of the most significant byte position; and an optical to digital converter for each summed optical signal that convert the summed optical signals, plus any added carry, to digital data signals and assembles the summed digital data signals into byte order to create a summed digital data signal representing a sum of the first and second digital data signals.

11. The optical adding system of claim 10, wherein each of the digital to optical converters comprises a digital to analog converter and an analog to optical converter.

12. The optical adding system of claim 11, wherein the analog to optical converters comprise laser diodes.

13. The optical adding system of claim 10, wherein each of the optical to digital converters comprises an optical to analog converter and an analog to digital converter.

14. The optical adding system of claim 13, wherein the optical to analog converters comprise photodiodes.

15. The optical adding system of claim 10, wherein each optical carry determinator is configured to compare the power of the summed optical signal with a reference power threshold, and add a carry to the summed optical signal of the next left byte position if the power of the summed optical signal exceeds the reference power threshold.

16. The optical adding system of claim 10, wherein each optical carry determinator comprises a photodiode, a logic device, and an optical modulator.

17. The optical adding system of claim 15, wherein the reference power thresholds of the optical carry determinators are the same or different.

18. The optical adding system of claim 15, wherein the optical carry determinators create a fixed carry or a carry that is the difference between the power of the respective summed optical signal and the respective reference power threshold.

* * * * *